Nov. 19, 1935.  R. H. WAINFORD  2,021,532

VALVE FOR PUMPS AND OTHER FLUID CIRCULATION APPARATUS OR LINES

Filed March 1, 1934

Inventor
Richard H. Wainford
By *Rumett H. Gauer*
Attorney

Patented Nov. 19, 1935

2,021,532

UNITED STATES PATENT OFFICE 2,021,532

VALVE FOR PUMPS AND OTHER FLUID CIRCULATION APPARATUS OR LINES

Richard H. Wainford, Trenton, N. J.

Application March 1, 1934, Serial No. 713,557

5 Claims. (Cl. 251—123)

This invention relates to improvements in valves for pumps and other fluid circulation apparatus or conductors; and the primary object of the invention is to provide a simple construction of valve which cannot clog or easily get out of order, and the working parts of which are insertible and removable as a unit in a ready manner when repairs and replacements are necessary because of damage or wear.

A further object of the invention is to provide a valve which is particularly adaptable for use, to furnish a durable type of valve, in pumps or liquid conductors handling liquids of different kinds and different specific gravities, chemicals, and fluent solid and semi-solid materials which ordinarily cause heavy wear and tear or other injurious effects upon the valve parts.

A still further object of the invention is to provide a valve which is adapted for use either as a suction valve or a discharge valve for pumps and which embodies the advantages above set forth.

The invention consists of the features of construction, combination and arrangement of parts, hereinafter fully described and claimed, reference being had to the accompanying drawing, in which:—

Figure 1:
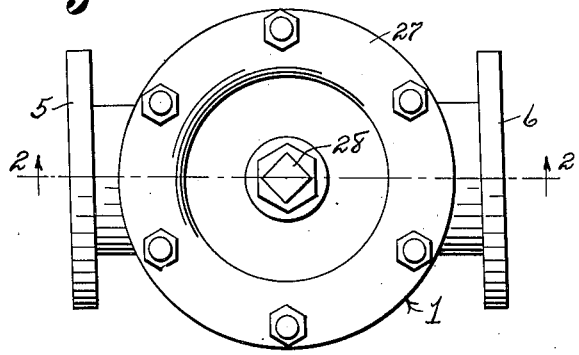
Fig. 1 is a top plan view of a valve constructed in accordance with my invention.
Figure 6:
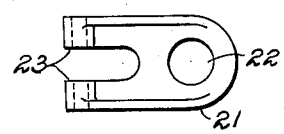
Fig. 6 is a top plan view of the valve carrier arm.

In the illustrated embodiment of my invention, I have shown a valve which is adapted for use either as an inlet or suction valve, or as a discharge valve, for a pump designed for the handling of materials of the character described. This valve comprises a cast metal casing 1 having a valve chamber 2 provided in its bottom with an inlet port 3 and in one of its sides with an outlet port 4, with which respectively communicate inlet and outlet branches 5 and 6 extending horizontally or laterally from opposite sides of the casing at different levels.

Figure 2:
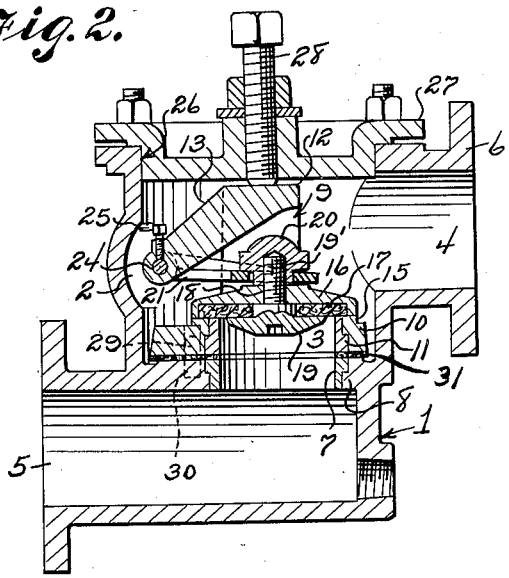
Fig. 2 is a vertical longitudinal section on line 2—2 of Fig. 1.
Figure 3:
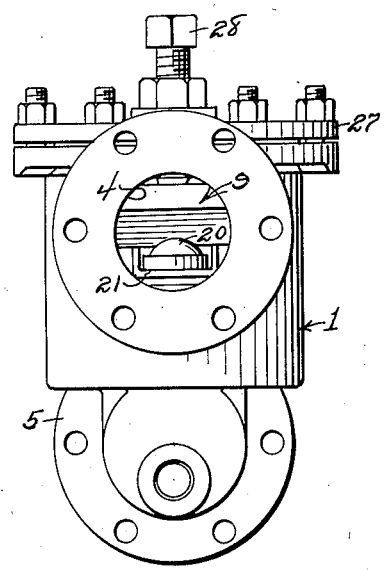
Fig. 3 is an end elevation of the valve.
Figure 4:
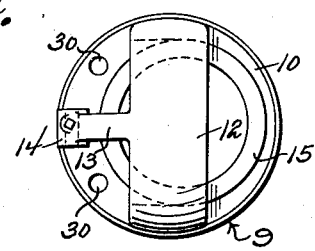
Fig. 4 is a top plan view of the valve cage.
Figure 5:
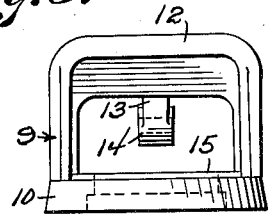
Fig. 5 is an end view of the same.

The port 3 is disposed at the base of the chamber 2 and between the same and the inlet branch 5 and has fitted therein a valve seat bushing 7. This bushing 7 and the portion of the valve casing 8 (Fig. 2) in which it is fitted forms a support for a detachable valve unit comprising a cage or frame 9 having an annular base part 10 formed with an opening communicating with the port and receiving a bushing 11 similar to the bushing 7. The upper surface of the base part 10 has rising therefrom an arched or U-shaped body or yoke portion 12 provided with a rearwardly extending arm or projection 13 terminating in an eye 14 and the upper surface of the base part 10 is suitably constructed to provide with the upper edge of the bushing 11 a seat 15 for the reception of a valve member 16 adapted to open under the pressure of the material flowing through the port 3 and to close by gravity on relief of such pressure. This valve member is provided in its underside with a cavity for receiving suitable packing material 17 and has extending axially therethrough an opening 18 for passage of a headed and threaded stud or fastening screw 19' extending from a clamping plate 19 which holds the packing in position, and receiving a threaded retaining nut or cap 20. The valve is mounted upon one end of a carrier arm or plate 21 having an opening or eye 22 for the passage of the screw stud, whereby such end of the carrier arm may be loosely and pivotally connected with the valve member and held in position thereon by the stud and nut 20. The opposite end of the carrier arm is slotted or bifurcated to provide eyes 23 which are disposed on opposite sides of the eye 14 of the cage arm 13. These eyes 23 and the eye 14 receive a pivot pin 24 on which the arm 21 is pivotally mounted, which pin is detachably secured in position by means of a set screw 25. The valve cage and valve constitute a detachable and replaceable valve unit which may be readily inserted and removed through an opening 26 in the top of the valve casing, which opening is normally closed by a detachable cover plate 27. Passing through the center of this cover plate is a clamping screw 28, adapted to engage the arched body or yoke portion 12 of the valve cage 9, whereby the cage or frame of such valve unit may be firmly clamped in position against the supporting portion 8 of the valve casing. In order to hold the valve cage in position when applied against any possibility of shifting movement, and to enable it to be centered and placed in position with accuracy, dowel pins and recesses 29 and 30, respectively, are provided in and upon the parts 8 and 10 for interconnection with each other, thus ensuring the proper placing and retention of the valve cage and valve unit in position. If desired, a suitable type of gasket 31 may be provided between the surfaces of parts 8 and 10 to prevent leakage.

In the operation of the valve, it will be understood that the valve member 16 is adapted to open upwardly under pressure from below to allow passage of material and to close positively by gravity upon cessation of the pressure. In its opening and closing movements the valve moves with the swinging arm 21 pivoting on the pin 24 as a center of motion, and as this arm is pivotally mounted for free motion an easy and positive movement of the valve in either direction, preventing possibility of sticking, is ensured.

From the foregoing description, taken in connection with the drawing, the construction and mode of operation of my improved valve will be readily understood and it will be seen that it provides a valve of very simple type and one not liable to get out of order. When this valve is damaged or worn to such a degree that it requires repairs or its replacement is necessary with a new one, this may be easily effected by removing the cover 27 and detaching the valve from its cage and properly repairing it or replacing it with another one. As the valve opens under pressure of the material and closes by gravity, the use of springs and other parts liable to become deranged in use is avoided, and, as such valve is of rugged type, it will give long service even under roughest usage.

What I claim is:—

1. A valve comprising a casing having a valve chamber provided with an inlet port in its bottom, an opening in its top, an intake connection communicating with said inlet port, and a lateral outlet connection communicating with the valve chamber at one side thereof, a valve cage insertible and removable through said top opening and including an annular seat portion communicating with the chamber and the inlet port and an arched yoke portion rising therefrom, an arm carried by the arched yoke portion of the cage, a gravity closing valve adapted to engage the seat portion of the cage, a swinging arm detachably connected at one end to the valve and pivotally connected at its opposite end to the arm of the yoke portion, and means for closing the opening in the top of the valve chamber.

2. A valve comprising a casing having a valve chamber provided with an inlet port in its bottom, an opening in its top, an intake connection communicating with said port, and a lateral outlet connection communicating with the valve chamber at one side thereof, a valve cage insertible and removable through said top opening and including an annular seat portion communicating with the inlet port and an arched yoke portion rising therefrom, an arm carried by the arched yoke portion of the cage, a gravity closing valve adapted to engage the seat portion of the cage, a swinging arm pivotally connected at one end to the arm of the yoke portion and having an opening in the opposite end thereof, fastening means engaging the opening in the arm and detachably connecting the valve therewith, a closure for the opening in the top of the valve casing, and means carried by said closure to engage and detachably hold the valve cage in position.

3. A valve comprising a casing having a valve chamber provided with an inlet port in its bottom, an opening in its top, an intake connection communicating with said port, and a lateral outlet connection communicating with the valve chamber at one side thereof, a valve cage insertible and removable through said top opening and including an annular seat portion communicating with the inlet port and an arched yoke portion rising therefrom, an arm carried by the arched yoke portion of the cage, a gravity closing valve adapted to engage the seat portion of the cage, a swinging arm pivotally connected at one end to the arm of the yoke portion and detachably connected at its opposite end to the valve, a closure for the opening in the top of the valve casing, and fastening means carried by said closure and separate from but engaging the yoke portion of the valve cage to detachably hold said valve cage in position.

4. A valve comprising a casing having a valve chamber provided with an inlet port in its bottom, an opening in its top, an intake connection communicating with said port, and a lateral outlet connection communicating with the valve chamber at one side thereof, a valve cage insertible and removable through said top opening and including an annular seat portion communicating with the inlet port and an arched yoke portion rising therefrom, an arm carried by the arched yoke portion of the cage, a gravity closing valve adapted to engage the seat portion of the cage, a swinging arm pivotally connected at one end to the arm of the yoke portion and detachably connected at its opposite end to the valve, a closure plate closing the opening in the top of the valve casing, and a binding screw carried by said plate and bearing upon the head of the yoke portion of the cage to detachably hold said cage in position.

5. A valve comprising a casing having a valve chamber provided with an inlet port in its bottom, an opening in its top, a horizontal intake connection communicating with said port and a lateral outlet connection communicating with the valve chamber at one side thereof, a valve cage insertible and removable through the top opening and including a seat member having a port therein registering with the inlet port in the casing and an arched yoke member extending upwardly therefrom, said yoke member being provided at its top with an arm offset therefrom into the valve chamber in a direction away from said outlet connection, a gravity closing valve member adapted to engage the valve seat member, a swinging arm arranged above the plane of said valve member and pivotally connected at one end to the offset arm of the yoke portion of the valve cage and detachably connected at its opposite end to the valve member, a closure for the open top of the valve chamber, and means carried by said closure to engage the valve yoke to detachably hold the cage in position.

RICHARD H. WAINFORD.